United States Patent [19]  
Pairaudeau et al.

[11] 4,446,091  
[45] May 1, 1984

[54] CARBON FIBER-REINFORCED CEMENT MOULD

[75] Inventors: Reginald D. Pairaudeau, Bristol, England; David Turnbull, Mississauga, Canada

[73] Assignee: Union Carbide Corporation, Danbury, Conn.

[21] Appl. No.: 361,105

[22] Filed: Mar. 23, 1982

Related U.S. Application Data

[60] Division of Ser. No. 190,830, Sep. 25, 1980, abandoned, which is a continuation of Ser. No. 954,589, Oct. 25, 1978, abandoned, which is a continuation of Ser. No. 867,122, Jan. 5, 1978, abandoned.

[51] Int. Cl.³ .................... B29D 3/02; B28B 21/56; B29G 7/00
[52] U.S. Cl. .................................. 264/225; 264/333; 264/338
[58] Field of Search .................. 106/99; 425/175; 264/219, 225, 337, 338, 129, 131, 333; 249/134

[56] References Cited

U.S. PATENT DOCUMENTS

| 2,317,597 | 4/1943 | Ford et al. | 425/175 |
| 2,324,990 | 7/1943 | Carter | 428/443 |
| 3,783,092 | 1/1974 | Majumdar | 106/99 |
| 3,834,916 | 9/1974 | Kesler | 106/99 |
| 4,302,414 | 11/1981 | Curnow et al. | 106/99 |

FOREIGN PATENT DOCUMENTS 2633310  3/1977  Fed. Rep. of Germany ........ 106/99

*Primary Examiner*—Willard E. Hoag  
*Attorney, Agent, or Firm*—David Fink

[57] ABSTRACT

A carbon fiber-reinforced cement mould is provided which is capable of being thermally cycled continually at temperatures up to 200° C. Such mould is particularly suitable for casting or forming plastic articles which require heating up to 200° C. to effect curing. Because the mould remains free from cracking and surface spalling during such thermal cycling, it can be used over and over again.

5 Claims, 2 Drawing Figures

CARBON FIBER-REINFORCED CEMENT MOULD

This application is a division of application, Ser. No. 190,830, filed Sept. 25, 1980 and now abandoned, which is a continuation of Ser. No. 954,589, filed Oct. 25, 1978 now also abandoned which is a continuation of Ser. No. 867,122 filed Jan. 5, 1978, now abandoned.

BACKGROUND OF THE INVENTION

This invention relates to a carbon fiber-reinforced mould suitable for casting or forming plastic articles. More particularly, this invention relates to a carbon fiber-reinforced mould having excellent thermal cycling characteristics which render it particularly suitable for casting or forming plastic articles.

In order to be useful in casting or forming plastic articles, a mould must be capable of undergoing repeated thermal cycling at temperatures up to about 200° C. without cracking. While metal moulds can be employed at elevated temperatures without cracking, such moulds are expensive to produce and can be fabricated in various complicated shapes only by time consuming and expensive machining. While ceramic moulds possess high temperature capability, they suffer from the disadvantage that they can only be produced at very elevated temperatures. Composite moulds reinforced with glass fibers have also been employed; however, these moulds also require relatively high temperatures and extensive heating in their production.

SUMMARY OF THE INVENTION

In accordance with the invention, a carbon fiber-reinforced cement mould is provided which is capable of being thermally cycled continually at temperatures up to 200° C. Such mould is particularly suitable for casting or forming plastic articles which require heating up to 200° C. to effect curing. Further, because the mould remains free from cracking and surface spalling during such thermal cycling, it can be used over and over again.

DETAILED DESCRIPTION OF THE INVENTION

The carbon fiber-reinforced cementitious moulds of the present invention can be easily and economically manufactured in a wide variety of complex shapes. Regardless of whether a male or female mould is desired, it can be produced by casting an aqueous hardenable hydraulic cementitious composition containing carbon fibers in a concave form. If the mould is to be used as a male member to form a plastic object on its exterior surface, the interior surface of the form used in its production should correspond to the contour of the object to be prepared. Parabolic radar antennas have been successfully prepared in this manner by laying up glass fiber-reinforced plastic on the cementitious mould. If, on the other hand, the mould is to be used as a female member to shape a plastic object within its cavity, then the mould should be prepared so that the surface of the mould cavity corresponds to the contour of the plastic object to be cast. In the latter event, the form employed to produce the mould should have both a male and female member to produce the desired cavity.

Any hydraulic cement can be used in the cement compositions employed to produce the carbon fiber-reinforced moulds of the present invention. Aggregate filler material may be employed together with the hydraulic cement in amounts conventionally employed. If a filler is employed, however, it is preferably a fine non-abrasive aggregate material, such as fly ash, and does not exceed twenty parts by weight of the total weight of cement and aggregate material.

The fibers used in the cement compositions employed in the production of the reinforced cement moulds of the present invention are high modulus, high strength carbon fibers. Such fibers are commercially available and can be prepared as described in U.S. Pat. Nos. 3,454,362, 3,412,062 and 4,005,183. The term "carbon" as used herein is intended to include graphitic and non-graphitic fibers.

The length of the carbon fibers employed may be varied to suit requirements, typical lengths being 5 mm. to 75 mm. The thickness of the fibers may vary from about 5 microns to about 25 microns, but is usually within the range of about 7 microns to 9 microns.

The amount of fibers employed is such as to obtain the desired characteristics, typically from 1 part by weight to 6 parts by weight of fibers per 100 parts by weight of the "dry components" of the cementitious composition. By "dry components" in this context is meant the cement and other solid aggregate filler material (if present) which together make up the cementitious composition, but not including the carbon fiber itself. Most usually the fibers are present in an amount of from 2.5 parts by weight to 5 parts by weight per 100 parts by weight of the dry materials.

The water, of course, must be employed in an amount sufficient to hydrate the cement. In order to produce a cementitious product having maximum strength, as well as low shrinkage and slump, however, the amount of water should be held to a minimum consistent with this purpose. Typically, from about 25 parts by weight to about 55 parts by weight, preferably from about 30 parts by weight to 45 parts by weight, of water per 100 parts by weight of the dry components in the mix are employed.

In order to facilitate incorporating the carbon fibers into the aqueous hardenable hydraulic cementitious mixture, a small amount of polyethylene oxide may be added to the mixture. Preferably, such polyethylene oxide is added in an amount sufficient to not only prevent clumping of the fiber strands or bundles employed, but also to effect separation of the individual fibers of such strands or bundles and more or less uniformly dispose them throughout the mix, i.e., to deflocculate the fiber strands or bundles. Generally, the polyethylene oxide is employed in an amount equal to at least 0.14 part by weight per 100 parts by weight of the dry components employed. Excessive amounts of polyethylene oxide do not appear to have any beneficial effects. For this reason, amounts of polyethylene oxide in excess of about 0.50 part by weight per 100 parts by weight of the dry components present are unnecessary.

The polyethylene oxide suitable for use in the invention is water soluble, has a molecular weight of from about 500,000 up to about 5,000,000, and is commercially available from Union Carbide Corporation under the trademark "Polyox." Grade WSR-301 has been found to be especially suitable. This grade has a molecular weight of about 4,000,000.

In order to thicken the cementitious composition so that it will not slump when cast into a desired shape, it is often desirable to add a thickening agent to the mix. Such thickening agent is usually added in an amount of from 0.5 part by weight to 4 parts by weight per 100 parts by weight of the dry components, most usually in an amount of from 1 part by weight to 3 parts by weight per 100 parts by weight of the dry components.

Mixing of the components of the cementitious composition, including the cement itself, aggregate material (if present), reinforcing carbon fibers, polyethylene oxide additive, thickening agent, and the required amounts of water, can be effected using conventional techniques. To facilitate dissolution of the polyethylene oxide, it is preferred to add this material to the water before it is admixed with the other components of the mixture. The thickening agent may also be added at this time. The carbon fibers are preferably added last, in a gradual manner and with stirring to ensure proper separation of the fiber strands of bundles and uniform dispersion of the individual filaments throughout the mix.

After formulation of the cementitious composition, as described above, it is formed into a mould by pouring it into a concave form having a shape corresponding to that of the desired mould and allowing it to set. As aforesaid, if the mould is to be used as a male member to form a plastic object on its exterior surface, the interior surface of the form used in its production should correspond to the contour of the object to be prepared. If, on the other hand, the mould is to be used as a female member to shape a plastic object within its cavity, then the mould should be prepared so that the surface of the mould cavity corresponds to the contour of the plastic object to be cast. In the latter event, the form employed to produce the mould should have both a male and female member to produce the desired cavity.

Referring now to the drawings.

Figure 1:
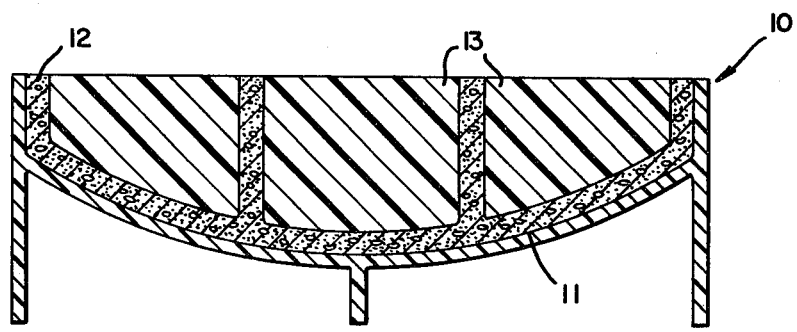
FIG. 1 is an elevated cross-sectional view of the side of a concave form suitable for the fabrication of a parabolic male mould on which a radar antenna can be formed.
Figure 2:
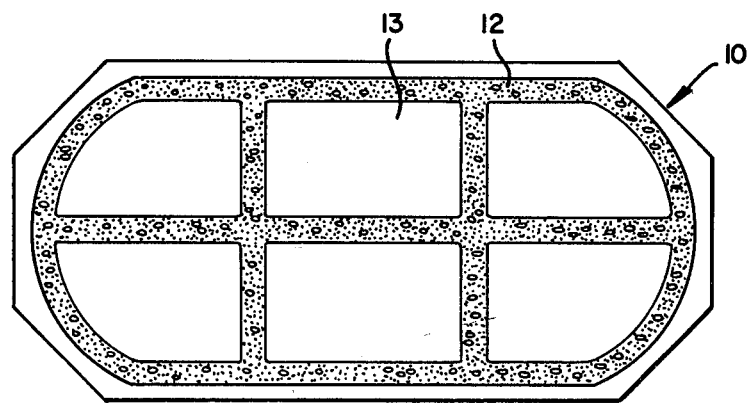
FIG. 2 is a top plane view of the form depicted in FIG. 1.

Glass fiber-reinforced concave form 10 is employed to produce a carbon fiber-reinforced male mould. The curved surface 11 of the form has a contour which corresponds to the contour of the parabolic radar antenna to be produced on the mould. The form is 60 inches long, 33 inches wide and 16 inches high at the deepest point of the parabola.

A carbon fiber-containing cementitious composition 12, produced in accordance with the invention, is spread onto curved surface 11 of form 10 to a thickness of 6 to 12 mm. To reduce the weight of the cement mould, six shaped blocks of polystyrene 13 are located in the cavity of form 10 before the remainder of the cementitious composition is poured into the form. The blocks measure 9.5"×18" at their tops, and their lower portions and edges, are shaped, where necessary, to conform to the parabolic contour of the form. The height of the blocks at their highest point is 15 inches. After the blocks are inserted, the remainder of the cementitious composition is carefully poured into the form and compacted by tamping into the spaces between the blocks. As a result, a relatively thin-walled structure only 1.5 inches thick is obtained.

The following example is set forth for purposes of illustration so that those skilled in the art may better understand this invention. It should be understood that it is exemplary only, and should not be construed as limiting this invention in any manner.

EXAMPLE

A carbon fiber-reinforced cement male mould having an exterior surface suitable for shaping a parabolic radar antenna thereon was produced by casting a formable cementitious composition in a concave glass fiber-reinforced plastic form whose curved surface corresponded to the contour of the desired radar antenna. The cementitious composition was produced by admixing the constituents shown in Table 1 below in a 5-gallon power operated mixer using a dough hook attachment.

TABLE 1

| Constituent | Parts by Weight |
| --- | --- |
| Cement | 100.0 |
| Carbon Fibers | 3.0 |
| Water | 44.0 |
| Polyethylene Oxide | 0.4 |
| Cement Thickener | 1.6 |

The polyethylene oxide was dissolved in the water before it was added to the cement. Dissolution was effected by adding fine granules of the polyethylene oxide to the water over a 3 minute period while stirring with a propeller, and then allowing the mixture to stand for 18–20 hours to permit complete dissolution. The polyethylene oxide employed was "Polyox" WSR-301, manufactured by Union Carbide Corporation, U.S.A. This resin is a fine white granular solid having a molecular weight of about 4,000,000.

In order to prevent slumping of the cementitious composition when it is cast into shape, a cement thickener was also dissolved in the water before the water was admixed with the cement. The thickener employed was "Aerosil"* colloidal silica, a thixotropic agent manufactured by Degussa Inc., Fed.-Rep. of Germany.

*"Aerosil" is a registered trademark.

The water containing both the polyethylene oxide and the cement thickener was then added to the cement and mixed for three minutes. Handfuls of carbon fibers were then added and stirring was continued for an additional 8 minutes. The cement employed was a Portland cement conforming to British Standard 12. The fibers employed consisted of a mixture of 50 parts by weight of "Thornel"* VMA fiber mat and 50 parts by weight of "Hyfil"** 27 chopped to a length of 12 mm. "Thornel" VMA mat is manufactured by Union Carbide Corporation and consists of carbon filaments having a length of 25 mm. to 75 mm., an average diameter of 9 microns, an average Young's modulus of $35 \times 10^6$ psi. (240 GPa) and an average tensile strength of $200 \times 10^3$ psi. (1.4 GPa). "Hyfil" 27 is manufactured by Hyfil Limited, United Kingdom, and consists of a continuous tow of 10,000 carbon filaments having an average diameter of 7–9 microns, an average Young's modulus of $27 \times 10^6$ psi., and an average tensile strength of $300 \times 10^3$ psi.

*"Thornel" is a registered trademark.
**"Hyfil" is a registered trademark.

The mixed constituents were spread onto the curved surface of the glass fiber-reinforced plastic form to a thickness of 6 to 12 mm., care being taken to avoid and remove air bubbles. The plastic form was 60 inches long, 33 inches wide, and 16 inches high at the deepest point of the paraboloid. To reduce the weight of the cement mould, six shaped blocks of polystyrene were located in the cavity of the form before the remainder of the cementitious composition was poured into the form. The blocks were 9.5"×18" at their tops, and their lower portions, and edges, were shaped, where necessary, to conform to the parabolic contour of the form in which the cementitious composition was being cast. The height of the blocks at their highest point was 15 inches. After the blocks had been inserted, the remainder of the cementitious composition was carefully poured into the form and compacted by tamping into the spaces between the blocks. As a result, a relatively thin-walled structure only 1.5 inches thick was obtained.

The cast mould was allowed to cure in the glass fiber-reinforced form for 18–20 hours, after which it was removed therefrom. The polystyrene blocks were then cut from the structure which was then covered with damp sacks and allowed to cure at room temperature for seven days. At the end of this time, the structure was dried by heating at 80°–90° C. for 10 hours in an air circulating oven.

In order to reduce the number and size of the voids on the surface of the mould, and to improve its finish, the surface of the mould can be coated with a finishing composition prepared in like manner to the cementitious composition employed to produce the mould. Since a high fiber content produces a mixture which is stiff and difficult to work, it is preferred to use a mixture containing no more than 3 parts by weight of fiber per 100 parts by weight of dry components. Thus, for example, a mixture containing 2.5 parts by weight of fiber per 100 parts by weight of cement has been found quite satisfactory, while a mixture containing 3.5 parts by weight of fiber has been found difficult to work with. Preferably, the carbon fibers employed are in mat form as fibers in this form appear to disperse better than chopped fibers and this results in a smoother mix. The use of such fiber mat makes it possible to use a lesser amount of polyethylene oxide, e.g., as low as 0.10 part by weight, or even less. In any event, care should be exercised to obtain as smooth a mix as possible, making every effort to ensure that all lumps are removed from the mix and that fresh cement is used whenever possible. The fibers should be added after the cement and water have been mixed to assist in obtaining a smooth mix.

A very satisfactory surface finish has been prepared by mixing 100 parts by weight of cement, 2.5 parts by weight of "Thornel" VMA fiber mat, 42.5 parts by weight of water, 0.1 part by weight of "Polyox" WSR-301 polyethylene oxide, and 0.5 part by weight of "Aerosil" thixotropic powder. The finish can be applied in any manner, such as by painting, spraying or trowelling. Coatings 4–6 mm. thick are most satisfactory. A most satisfactory finish has been prepared by painting on a first layer 3 mm. thick by means of a brush, followed by a 1.5 hour cure before trowelling on and lightly rolling a second 3 mm. thick layer.

Alternatively, in order to obtain good release characteristics the voids in the surface of the mould can be filled with an epoxy resin, rubbed with a fine abrasive paper and water, and then sprayed with poly(tetrafluoroethylene) after drying.

What is claimed is:

1. In a process for making and using a mold wherein a heat curable plastics composition is disposed in said mold and cured by heat, the improvement comprising: making said mold by combining carbon fibers with hydraulic cement and aggregate in the proportions of 1 to 6 parts by weight of said fibers to 100 parts by weight of said cement and aggregate and forming a coating, and mold surfaces to be in contact with said plastics composition such that said coating contains not more than 1–3 parts of carbon fibers by weight to 100 parts by weight of hydraulic cement and aggregate.

2. The process of claim 1, wherein said mould is produced with 2.5 parts by weight to 5 parts by weight of carbon fibers per 100 parts by weight of cement and aggregate filler material.

3. The process of claim 1, wherein said mould is produced with 1 part by weight to 3 parts by weight of carbon fibers per 100 parts by weight of cement and aggregate filler material.

4. The process of claim 1, wherein said finished surface is from about 4 mm to about 6 mm thick.

5. The process of claim 1, wherein said mould is produced in the shape of a paraboloid.

* * * * *